United States Patent [19]

Epsom et al.

[11] Patent Number: 5,003,617

[45] Date of Patent: Mar. 26, 1991

[54] SIMULCAST BROADCASTING SYSTEM AND METHOD

[75] Inventors: Robert L. Epsom, Palatine; Paul M. Erickson, Hanover Park; Paul J. Cizek, Palatine; Christopher H. Wilson, Lake Zurich, all of Ill.

[73] Assignee: Motorola, Inc., Schaumburg, Ill.

[21] Appl. No.: 563,894

[22] Filed: Aug. 6, 1990

Related U.S. Application Data

[63] Continuation of Ser. No. 261,528, Oct. 21, 1988, abandoned.

[51] Int. Cl.⁵ .............................................. H04B 7/14
[52] U.S. Cl. ...................................... 455/51; 455/18; 455/13; 455/57; 455/67
[58] Field of Search ...................... 455/18, 16, 51, 33, 455/67, 226, 57, 53, 49, 56, 13

[56] References Cited

U.S. PATENT DOCUMENTS

| | | | |
|---|---|---|---|
| 4,188,582 | 2/1980 | Cannalte et al. | 455/92 |
| 4,255,814 | 3/1981 | Osborn | 455/51 |
| 4,317,217 | 2/1982 | Davidson et al. | 455/24 |
| 4,363,129 | 12/1982 | Cohn et al. | 455/17 |
| 4,475,246 | 10/1984 | Bativala et al. | 455/18 |
| 4,570,265 | 2/1986 | Thro | 455/52 |
| 4,578,815 | 3/1986 | Persinotti | 455/15 |
| 4,696,052 | 9/1987 | Breeden | 455/51 |

FOREIGN PATENT DOCUMENTS 0197556  10/1986  European Pat. Off. .

Primary Examiner—Douglas W. Olms
Assistant Examiner—Ralph Smith
Attorney, Agent, or Firm—Darleen J. Stockley; Steven G. Parmelee

[57] ABSTRACT

A simulcast broadcast system wherein two signals (103 and 106) intended for simultaneous broadcast are transmitted from a source site (100) to remote sites (200) discrete from one another. At the remote sites, the two signals are separately processed, including the introduction of appropriate delay (305 and 312), prior to combining them for broadcast in conjunction with other remote sites. One or more monitoring sites (400) can also be provided to monitor reception coherence within the system and to provide operating measurement information to allow automatic control of various simulcast system parameters, including delay.

2 Claims, 2 Drawing Sheets

SIMULCAST BROADCASTING SYSTEM AND METHOD

This is a continuation of application Ser. No. 07/261,528, filed Oct. 21, 1988 and now abandoned.

TECHNICAL FIELD

This invention relates generally to simulcast radio communications systems.

BACKGROUND ART

Simulcast radio communications systems are typically employed to provide wide area one-way or two-way radio communications services. In such a system, a source site typically originates (or forwards from another originating site) a signal to be generally broadcast. This signal is routed from the source site to a plurality of remote sites. Each remote site then simultaneously broadcasts the signal with other remote sites to facilitate reception of the signal by receivers within the area covered by the system.

In this way, a receiver outside the operating range of one remote site may still be within the range of one or more other remote sites, thereby reasonably ensuring that the receiver can receive the signal.

One particularly difficult problem with such simulcast systems involves coordinating the various remote sites to ensure that the signals are in fact substantially simultaneously broadcast by each. A failure to accomplish this will result in instances of unacceptable reception coherence as potentially caused by phase offsets, deviation, distortion and the like.

Another problem arises when more than two signals must be transmitted simultaneously; for example, a voice signal and a data signal. Prior art methods of processing such combined signals in a simulcast environment have not always been adequately conducive to supporting necessary levels of reception coherence.

Finally, even when initially properly adjusted for proper reception coherence, the operating performance of a given simulcast system may vary in response to a number of changing operating and environmental factors. No prior art systems provide for a means of allowing a simulcast system to respond in any convenient or efficacious manner to such circumstances.

A need exists for a simulcast system that provides for the substantially simultaneous broadcast of a signal from a plurality of remote sites, particularly where the signal to be broadcast itself includes at least two signals. A need further exists for a system that can adapt one or more of its operating parameters to continually provide transmissions of acceptable reception coherence even when other operating factors or environmental conditions change.

SUMMARY OF THE INVENTION

These needs and others are substantially met through provision of the improved simulcast broadcasting system disclosed herein. The system includes generally a source site for providing an original signal to be broadcast, and a plurality of remote sites for substantially simultaneously broadcasting the original signal from the source site.

In one embodiment, the source site provides both a first and a second signal (such as voice and data). The source site provides these two signals to the remote sites discrete from one another. Only after reception and appropriate processing at the remote site will the two signals be combined to facilitate their broadcast.

In one embodiment, the appropriate processing provided to the first and second signals at the remote sites includes introduction of an appropriate time delay to ensure that all of the remote sites broadcast substantially the same signal with substantially the same phase relationship.

In another embodiment, a monitoring device can be provided to monitor broadcast signals from the remote sites, and determine whether the broadcast signals exhibit an acceptable reception coherence.

One or more exhibit an acceptable reception coherence. One or more broadcast system parameters can then be automatically varied in response to this determination as appropriate to improve reception coherence.

BEST MODE FOR CARRYING OUT THE INVENTION

Figure 1:
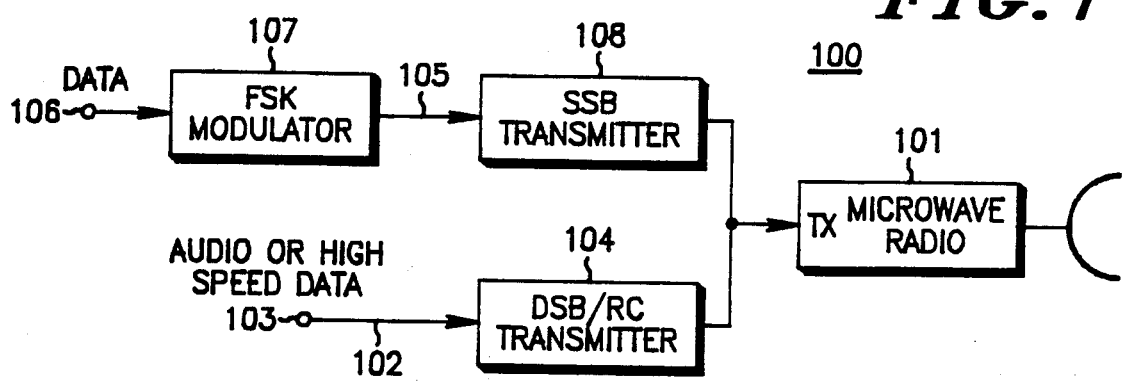
FIG. 1 comprises a block diagram depiction of source site structure.
Figure 2:
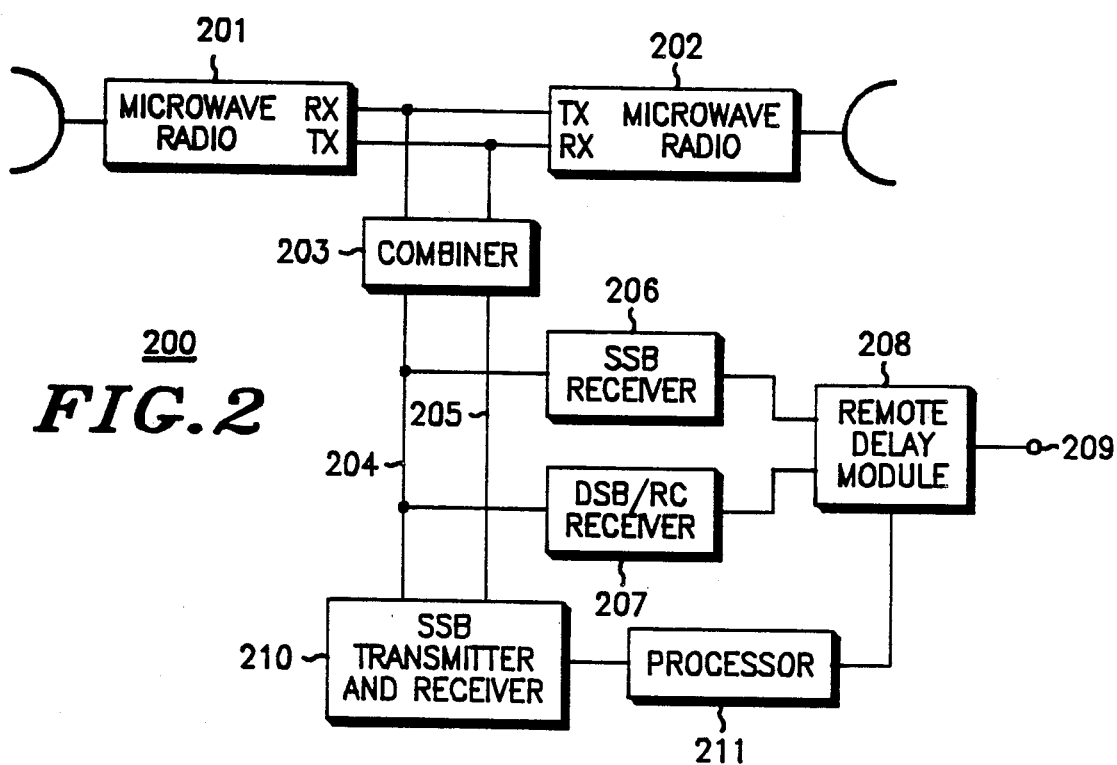
FIG. 2 comprises a block diagram depiction of remote site structure.

The invention includes generally a source site unit (SSU) (100) (FIG. 1) and a remote site unit (RSU) (200) (FIG. 2).

Referring to FIG. 1, the SSU (100) includes generally a microwave radio (101) that receives both audio and data input. The microwave radio (101) functions to transmit the two separate incoming signals in a known multiplexed manner to the RSUs (200) as described below in more detail.

The SSU audio path (102) includes an audio source input (103) (which may be on site or off, as may be appropriate to the application or function) that passes through a transmission block (104) configured in known manner as a double sideband/reduced carrier, the output of which transmitter (104) couples to a transmitter input port of the microwave radio (101). In certain applications, as in trunked communications, this input (103) could alternatively receive high speed data, such as control channel signalling.

The data path (105) includes a data source (106) (which provides, for example, low speed data intended to be ultimately coupled subaudibly with the audio information). The data source (106) passes through an FSK modulator (107) to a single sideband configured transmitter (108). The latter transmitter (108) sums to a transmit port of the microwave radio (101).

For purposes of explanation, the audio signal can be a first signal, and the data signal can be a second signal, with the ultimate intent being to provide a signal to a subscriber unit, such as a mobile, portable or fixed receiver, in a combined format. Upon reception, the radio will render the voice information audible, and will subaudibly process and act accordingly upon the data information or instructions. It should be noted that in this system, contrary to prior art technique, the first and second signals are not combined at the SSU (100). Instead, they are transmitted separately and discrete from one another, from any site, to the RSUs (200).

Referring now to FIG. 2, an example RSU (200) will be described. The RSU (200) includes a repeater structure comprised of two microwave radios (201 and 202). Signals received by the first microwave radio (201) are subsequently repeated and transmitted by the second microwave radio (202), for instance to another RSU. Similarly, signals received from down stream RSUs can be received by the second microwave radio (202) and transmitted to the SSU via the first microwave radio (201). Again, these radios (201 and 202) function in a known manner to receive and transmit multiplexed signals, including the first and second signals provided by the SSU (100).

The RSU (200) also includes a combiner (203) as well understood in the art. The combiner provides a high frequency received information line (204) and a high frequency transmit information line (205). A single sideband configured receiver (206) couples to the receive line (204) and functions to receive the data information as transmitted by the SSU (100). A double sideband/reduced carrier configurated receiver (207) also couples to the receive line (204) and functions to receive the audio information as separately transmitted by the SSU (100).

The output of both receivers (206 and 207) is provided to a remote delay module (RDM) (208), the configuration and operation of which will be described in more detail below. The output (209) of the remote delay module includes recovered audio information and recovered data information, appropriately processed, delayed, and combined. This combined signal can then be provided to appropriate transmitter equipment to allow a general broadcast of the information in a known manner.

The RSU (200) also includes a single sideband configured transceiver (210) that couples to both high frequency lines of the combiner (203) and communicates with a processor unit (211) that provides appropriate control instructions to the RDM (208) as also described in more detail below.

Figure 3:
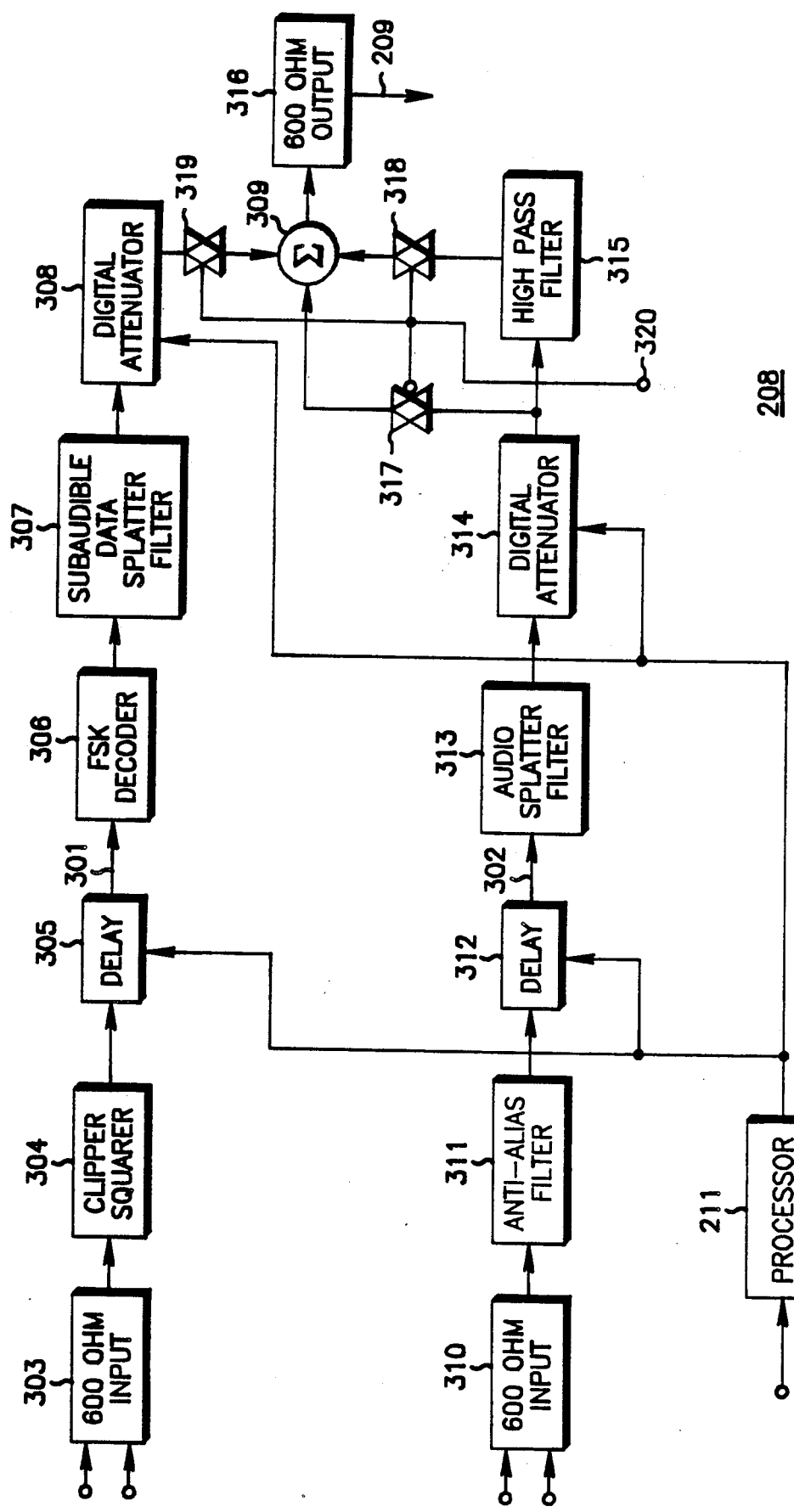
FIG. 3 comprises a block diagram depiction of the remote delay module of the remote site.

Referring now to FIG. 3, the RDM (208) includes a data path (301) and an audio path (302). The data path (301) couples to the output of the single sideband receiver (206) through a 600 ohm input unit (303), following which the signal is appropriately clipped and squared (304) in a known manner. The data signal is then passed through an appropriate delay unit (305). The delay unit (305) introduces a time delay in any appropriate known manner to accomplish a predetermined delay of propagation of the data signal to the transmitter of the RSU (200). (The purpose of this delay is to ensure that all RSUs (200) transmit a given source signal as provided by the SSU (100) at substantially the same time. Therefore, the delay at any particular RSU (200) will likely be unique to that RSU.) The delayed data signal then passes through an appropriate FSK decoder (306) and subaudible data splatter filter (307) to a digital attenuator unit (308). Following appropriate attenuation as required to provide necessary equalization, the data signal is provided to a summing unit (309), the operation of which will be disclosed in more detail below.

The audio path (302) connects to the output of the double sideband/reduced carrier receiver (207) through an appropriate 600 ohm input (310). The audio signal is then passed through an appropriate anti-alias filter (311) to a delay unit (312), the function and purpose of which is the same as that described above for the data path delay unit (305).

Following introduction of the appropriate delay, the audio signal passes through an appropriate splatter filter (313) and digital attenuator (314) to provide the necessary equalization, following which the signal passes through a highpass filter (315) to the summing unit (309).

The summing unit (309) functions to sum the delayed and properly processed data signals with the delayed and properly processed audio signals to thereby provide a composite signal. This composite signal then passes through an appropriate 600 ohm output unit (316) for subsequent processing (209) as referenced above. (In a trunked system, as noted earlier the audio path (302) may receive high speed data instead of voice information. To accommodate such an embodiment, the inputs to the summing unit (309) can be controlled by a number of logic gates (317, 318, and 319) that respond to an appropriate control signal (320). So configured, the summing unit (309) will receive either both high pass filtered audio information and low speed data, or high speed data only that has not been high pass filtered.)

It should be noted that the signal processing, such as equalization and introduction of delay, occur at the RSU (200) as versus the SSU (100). Also, it should be noted that, at the RSU (200), the first and second signals are individually and separately provided with the appropriate delay and other signal compensation factors prior to their combination.

In FIG. 3, it can also be seen that the delay units (305 and 312) and the digital attenuators (308 and 314) can be controlled by the processor (211) referenced above. The processor (211) in turn can receive data information and/or instructions from the SSU (100) through the microwave radio link. As a result, instructions regarding the appropriate delay and attenuation can be formulated at the SSU (100) and transmitted to the various RSUs (200), and implemented without human intervention.

Figure 4:
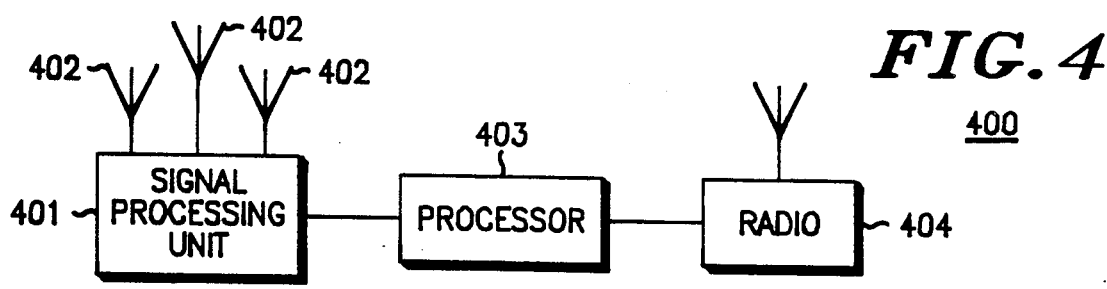
FIG. 4 comprises a block diagram depiction of a monitoring site.

With reference to FIG. 4, a monitoring site (400) in accordance with the invention can be seen as depicted generally by the numeral 400. A typical monitoring site includes a signal processing unit (401) that could include, for example, a number of directional antennas (402). Each antenna (402) could be directed to a particular RSU (200). The signal processing unit (401) utilizes that information to develop information regarding reception coherence for signals broadcast by the RSUs (200). A processor (403) can be provided that takes the reception coherence information developed by the signal processing unit (401) and compares it against an appropriate threshold or other criteria. Information regarding the comparisons developed by the processor (403) can be transmitted via an appropriate radio (404) or other link to the SSU (100) or other control location. Based upon information developed by the monitoring site (400) regarding reception coherence, the delay and/or attenuation parameters for a given RSU (200) can be selectively varied to accommodate changing operating or environmental conditions.

We claim:

1. A method of simulcasting a broadcast signal from at least two remote sites, said broadcast signal comprising at least a combined first signal and a second separate signal, the method comprising the steps of:

(a) transmitting from a source site said first signal to said at least two remote sites;

(b) separately transmitting from any source site said second separate signal to said at least two remote sites;

(c) at said least two remote sites, delaying said first and second signals by a predetermined amount to provide delayed first and second signals, which predetermined amount may be different for each of said at least two remote sites;

(d) combining said delayed first and second signals to provide a composite signal; and (e) broadcasting said composite signal substantially simultaneously from said at least two remote sites to provide said broadcast signal.

2. The method of claim 1 and further including are steps of:

(f) monitoring, at least from time to time, said broadcast signal as broadcast by at least some of said at least two remote sites;

(g) determining whether said broadcast signal as monitored has acceptable reception coherence;

(h) automatically varying at least one of said first signal, said second signal, said composite signal, and said broadcast signal as required to improve said reception coherence.

* * * * *

UNITED STATES PATENT AND TRADEMARK OFFICE
CERTIFICATE OF CORRECTION

PATENT NO. : 5,003,617

DATED : March 26, 1991

INVENTOR(S) : Robert L. Epsom; Paul M. Erickson; Paul J. Cizek; Christopher H. Wilson It is certified that error appears in the above-identified patent and that said Letters Patent is hereby corrected as shown below:

Column 5, line 4, "at said least" should be --at said at least--.

Signed and Sealed this

Nineteenth Day of January, 1993

Attest:

DOUGLAS B. COMER

*Attesting Officer*      *Acting Commissioner of Patents and Trademarks*